United States Patent
Partin et al.

(10) Patent No.: US 8,071,233 B2
(45) Date of Patent: Dec. 6, 2011

(54) INTEGRATED CURRENT-INTERRUPT DEVICE FOR LITHIUM-ION CELLS

(75) Inventors: Phillip E. Partin, Grafton, MA (US); Sherman H. Zeng, Brookfield, CT (US); Per Onnerud, Framingham, MA (US); Yanning Song, Chelmsford, MA (US); Richard V. Chamberlain, II, Fairfax Station, VA (US)

(73) Assignee: Boston-Power, Inc., Westborough, MA (US)

( * ) Notice: Subject to any disclaimer, the term of this patent is extended or adjusted under 35 U.S.C. 154(b) by 933 days.

(21) Appl. No.: 11/821,585

(22) Filed: Jun. 22, 2007

(65) Prior Publication Data

US 2008/0008928 A1   Jan. 10, 2008

Related U.S. Application Data

(60) Provisional application No. 60/816,775, filed on Jun. 27, 2006.

(51) Int. Cl.
H01M 2/34   (2006.01)
H01M 10/04   (2006.01)

(52) U.S. Cl. .............................. 429/61; 29/623.1; 429/57

(58) Field of Classification Search .............. 429/61–62; 29/623.1
See application file for complete search history.

(56) References Cited

U.S. PATENT DOCUMENTS

| | | |
|---|---|---|
| 4,025,696 A | 5/1977 | Tucholski et al. |
| 4,028,478 A | 6/1977 | Tucholski |
| 4,576,303 A | 3/1986 | Mundt et al. |
| 4,787,180 A | 11/1988 | Robinson et al. |
| 4,788,112 A | 11/1988 | Kung |
| 4,838,447 A | 6/1989 | Albracht et al. |
| 4,943,497 A | 7/1990 | Oishi et al. |
| 4,951,697 A | 8/1990 | Fritts |

(Continued)

FOREIGN PATENT DOCUMENTS

CA   2163187   5/1997

(Continued)

OTHER PUBLICATIONS

Written Opinion of the International Preliminary Examining Authority, PCT/US2007/014592, 6 pp., Date of Mailing Sep. 22, 2008.

(Continued)

Primary Examiner — Jonathan Crepeau
Assistant Examiner — Muhammad Siddiquee
(74) Attorney, Agent, or Firm — Hamilton, Brook, Smith & Reynolds, P.C.

(57) ABSTRACT

A battery comprises a first terminal in electrical communication with a first electrode of the battery, a second terminal in electrical communication with a second electrode of the battery, a battery can electrically insulated from the first terminal, and at least one current interrupt device in electrical communication with the battery can. The battery can includes a cell casing and a lid which are in electrical communication with each other. At least a portion of the battery can is at least a component of the second terminal, or is electrically connected to the second terminal. The current interrupt device includes a first conductive plate in electrical communication with the second electrode, and a second conductive plate in electrical communication with the first conductive plate. The second conductive plate separates from the first conductive plate when pressure inside the battery is greater than a predetermined value, whereby a current flow between the second electrode and the second terminal is interrupted.

22 Claims, 5 Drawing Sheets

U.S. PATENT DOCUMENTS

| | | | |
|---|---|---|---|
| 4,978,947 | A | 12/1990 | Finnegan |
| 5,036,632 | A | 8/1991 | Short, III et al. |
| 5,082,133 | A | 1/1992 | Farwell et al. |
| 5,418,082 | A | 5/1995 | Taki et al. |
| 5,570,803 | A | 11/1996 | Farwell |
| 5,585,207 | A | 12/1996 | Wakabe et al. |
| 5,678,307 | A | 10/1997 | Farwell |
| 5,691,073 | A | 11/1997 | Vu et al. |
| 5,705,290 | A | 1/1998 | Azema |
| 5,707,756 | A | 1/1998 | Inoue et al. |
| 5,738,952 | A | 4/1998 | Abe |
| 5,741,606 | A | 4/1998 | Mayer et al. |
| 5,750,277 | A | 5/1998 | Vu et al. |
| 5,776,627 | A | 7/1998 | Mao et al. |
| 5,821,008 | A | 10/1998 | Harada et al. |
| 5,853,912 | A | 12/1998 | Naing et al. |
| 5,869,208 | A | 2/1999 | Miyasaka |
| 5,879,832 | A | 3/1999 | Vu et al. |
| 5,879,834 | A | 3/1999 | Mao |
| 5,958,617 | A | 9/1999 | Kozuki et al. |
| 5,962,167 | A | 10/1999 | Nakai et al. |
| 6,033,797 | A | 3/2000 | Mao et al. |
| 6,063,518 | A | 5/2000 | Dewulf et al. |
| 6,065,485 | A | 5/2000 | Rooker |
| 6,087,036 | A | 7/2000 | Rouillard et al. |
| 6,114,942 | A | 9/2000 | Kitamoto et al. |
| 6,165,637 | A | 12/2000 | Azema |
| 6,204,635 | B1 | 3/2001 | Sullivan |
| 6,228,523 | B1 | 5/2001 | Azema |
| 6,274,264 | B1 | 8/2001 | Azema |
| 6,296,965 | B1 | 10/2001 | Azema |
| 6,296,970 | B1 | 10/2001 | Killebrew et al. |
| 6,346,344 | B1 | 2/2002 | Song et al. |
| 6,376,120 | B1 | 4/2002 | Azema |
| 6,399,237 | B1 | 6/2002 | Souliac et al. |
| 6,403,250 | B1 | 6/2002 | Azema et al. |
| 6,632,572 | B1 | 10/2003 | Takahashi et al. |
| 6,730,430 | B2 | 5/2004 | Chang |
| 6,805,991 | B2 | 10/2004 | Abe |
| 6,878,481 | B2 | 4/2005 | Bushong et al. |
| 6,900,616 | B2 | 5/2005 | Burrus, IV et al. |
| 7,175,935 | B2 | 2/2007 | Welsh |
| 7,288,920 | B2 | 10/2007 | Bushong et al. |
| 7,335,439 | B2 | 2/2008 | Kawano et al. |
| 7,763,375 | B2 | 7/2010 | Igoris et al. |
| 7,763,386 | B2 | 7/2010 | Hosoya et al. |
| 2002/0004169 | A1 | 1/2002 | Yamada et al. |
| 2002/0051905 | A1* | 5/2002 | Kitoh et al. ............... 429/176 |
| 2003/0180615 | A1 | 9/2003 | Johnson et al. |
| 2004/0115523 | A1 | 6/2004 | Hommura et al. |
| 2004/0228061 | A1 | 11/2004 | Kim et al. |
| 2004/0232888 | A1 | 11/2004 | Burrus, IV et al. |
| 2004/0234842 | A1 | 11/2004 | Kawano et al. |
| 2005/0214634 | A1 | 9/2005 | Kim |
| 2005/0233217 | A1 | 10/2005 | Fujihara et al. |
| 2006/0019150 | A1 | 1/2006 | Rigobert et al. |
| 2006/0051666 | A1 | 3/2006 | Kim |
| 2006/0083984 | A1* | 4/2006 | Oh et al. ............ 429/176 |
| 2006/0115713 | A1 | 6/2006 | Kim et al. |
| 2006/0121336 | A1 | 6/2006 | Yoon |
| 2006/0216588 | A1* | 9/2006 | Kim et al. ............ 429/174 |
| 2006/0257745 | A1 | 11/2006 | Choi et al. |
| 2006/0275657 | A1 | 12/2006 | Kozuki et al. |
| 2007/0026315 | A1 | 2/2007 | Lampe-Onnerud et al. |
| 2007/0298314 | A1 | 12/2007 | Partin et al. |
| 2008/0289945 | A1 | 11/2008 | Brazier et al. |
| 2009/0029193 | A1 | 1/2009 | Onnerud |
| 2009/0117451 | A1 | 5/2009 | Jung |
| 2010/0143770 | A1 | 6/2010 | Onnerud et al. |
| 2011/0024396 | A1 | 2/2011 | Onnerud et al. |

FOREIGN PATENT DOCUMENTS

| | | |
|---|---|---|
| CA | 2099657 | 4/1998 |
| CN | 1372341 | 10/2002 |
| CN | 1435908 | 8/2003 |
| CN | 101479865 | 7/2009 |
| CN | 101803070 | 8/2010 |
| EP | 0 863 559 A1 | 9/1998 |
| EP | 0 930 662 A2 | 7/1999 |
| EP | 0 959 508 A1 | 11/1999 |
| EP | 0969535 A1 | 1/2000 |
| EP | 1 429 402 A2 | 6/2004 |
| EP | 1 482 577 A1 | 12/2004 |
| JP | 10 172528 A | 6/1998 |
| JP | 11 003698 | 1/1999 |
| JP | 2002025526 | 1/2002 |
| WO | WO 98/45888 | 10/1998 |
| WO | WO 2006/071972 A2 | 7/2006 |
| WO | WO 2007/072759 A1 | 6/2007 |
| WO | WO 2007/149102 A1 | 12/2007 |
| WO | WO 2008/002487 A2 | 1/2008 |
| WO | WO 2008/069476 A1 | 6/2008 |
| WO | WO 2008/140702 A3 | 11/2008 |
| WO | WO 2009/002438 A1 | 12/2008 |
| WO | WO 2009/131894 A1 | 10/2009 |
| WO | WO 2010/080588 A1 | 7/2010 |
| WO | WO 2010/088332 A1 | 8/2010 |

OTHER PUBLICATIONS

PCT International Preliminary Report on Patentability, PCT/US2007/014592, 14 pp., Date of Completion of Report Oct. 28, 2008.

PCT International Search Report and PCT Written Opinion of the International Searching Authority, PCT/US2008/007666, Date of Mailing Oct. 13, 2008.

Office Action, U.S. Appl. No. 12/902,358, date of mailing Nov. 22, 2010.

The Lincoln Electric Company, Arc-Welding Fundamentals, from the Internet: http://www.lincolnelectric.com/knowledge/articles/content/arcweldfund.asp; downloaded Nov. 10, 2010.

Notice of Allowance, U.S. Appl. No. 12/214,535, date of mailing Jul. 16, 2010.

Written Opinion of the International Preliminary Examining Authority, International Application No. PCT/US2009/040839, date of mailing May 4, 2010.

International Search Report and Written Opinion of the International Searching Authority, or the Declaration, International Application No. PCT/US2010/022327, date of mailing Mar. 26, 2010.

Final Office Action from U.S. Appl. No. 12/214,535, mailing date Jan. 15, 2010.

International Preliminary Report on Patentability, PCT/US2008/007666, mailing date Jul. 14, 2009.

International Preliminary Report on Patentability, PCT/US2009/040845, mailing date Jun. 25, 2010.

International Preliminary Report on Patentability, PCT/US2009/040839, mailing date Jul. 28, 2010.

International Preliminary Report on Patentability, PCT/US2009/068679, mailing date Apr. 1, 2011.

International Search Report and Written Opinion from PCT/US2008/0C7666, mailing date Oct. 13, 2008.

International Search Report and Written Opinion, PCT/US2009/040845, mailing date Feb. 3, 2010.

International Search Report, PCT/US2009/040839, mailing date Jun. 17, 2009.

International Search Report and Written Opinion, PCT/US2009/068679, mailing date Mar. 18, 2010.

International Search Report, PCT/US2007/014592, mailing date Mar. 20, 2008.

Invitation to Pay Additional Fees and, Where Applicable, Protest Fee, PCT/US2009/040845, mailing date Oct. 2, 2009.

Office Action from U.S. Appl. No. 12/214,535, date of mailing Jul. 20, 2009.

Office Action from U.S. Appl. No. 12/623,153, date of mailing Sep. 1, 2010.

Notice of Allowance and Fee(s) Due for U.S. Appl. No. 12/902,358, Date Mailed: Jul. 5, 2011.

Office Action from U.S. Appl. No. 13/017,151, Date of Mailing May 23, 2011.

* cited by examiner

INTEGRATED CURRENT-INTERRUPT DEVICE FOR LITHIUM-ION CELLS

RELATED APPLICATION

This application claims the benefit of U.S. Provisional Application No. 60/816,775, filed Jun. 27, 2006, the entire teachings of which are incorporated herein by reference.

INCORPORATION BY REFERENCE

U.S. patent application, filed on Jun. 22, 2007 under 60/936,825, which is entitled "Low Pressure Current Interrupt Device For Batteries"; International Application, filed on Jun. 22, 2007 under 61/125,285, entitled "Lithium-Ion Secondary Battery"; U.S. Provisional Application No. 60/717,898, filed on Sep. 16, 2005; International Application No. PCT/US2005/047383, filed on Dec. 23, 2005; U.S. patent application Ser. No. 11/474,081, filed on Jun. 23, 2006; U.S. patent application Ser. No. 11/474,056, filed on Jun. 23, 2006; U.S. Provisional Application No. 60/816,977, filed on Jun. 28, 2006; U.S. patent application Ser. No. 11/485,068, filed on Jul. 12, 2006; U.S. patent application Ser. No. 11/486,970, filed on Jul. 14, 2006; and U.S. Provisional Application No. 60/852,753, filed on Oct. 19, 2006 are all incorporated herein by reference in their entirety.

BACKGROUND OF THE INVENTION

Li-ion batteries in portable electronic devices typically undergo different charging, discharging and storage routines based on their use. Batteries that employ Li-ion cell chemistry may produce gas when they are improperly charged, shorted or exposed to high temperatures. This gas can be combustible and may compromise the reliability and safety of such batteries. A current interrupt device (CID) is typically employed to provide protection against any excessive internal pressure increase in a battery by interrupting the current path from the battery when pressure inside the battery is greater than a predetermined value. The CID typically includes first and second conductive plates in electrical communication with each other. The first and second conductive plates are, in turn, in electrical communication with an electrode and a terminal of the battery, respectively. The second conductive plate separates from (e.g., deforms away or is detached from) the first conductive plate of the CID when pressure inside the battery is greater than a predetermined value, whereby a current flow between the electrode and the terminal is interrupted.

Generally, however, CIDs that have been incorporated within batteries significantly limit the capacity of batteries by a large amount of space within the batteries. Further, generally, a positive thermal coefficient (PTC) layer which is in electrical communication with a negative terminal of the battery is placed over the CID, and also occupies space within the batteries. PTC layers typically are employed in batteries to provide protection against short circuits external to batteries, i.e., by interrupting the current path when an overcurrent or an overvoltage is supplied.

Therefore, there is a need for a new battery design to accommodate a CID for safety of the battery, but yet minimizing the space occupied by the CID within the battery.

SUMMARY OF THE INVENTION

The present invention generally relates to a battery integrated with a CID in electrical communication with a battery can of the battery, to a battery pack including a plurality of such batteries (or cells), and to a method of preparing such a battery.

In one embodiment, the present invention is directed to a battery comprising: a) a first terminal in electrical communication with a first electrode of the battery; b) a second terminal in electrical communication with a second electrode of the battery; c) a battery can electrically insulated from the first terminal, wherein at least a portion of the battery can is at least a component of the second terminal, or is electrically connected to the second terminal; and d) at least one CID in electrical communication with the battery can. The battery can includes a cell casing and a lid which are in electrical communication with each other. The CID includes a first conductive plate in electrical communication with the second electrode; and a second conductive plate in electrical communication with the first conductive plate. In one embodiment, the second conductive plate is also in electrical communication with the battery can. The second conductive plate separates from the first conductive plate when pressure inside the battery is greater than a predetermined value, whereby a current flow between the second electrode and the second terminal is interrupted.

In another embodiment, the present invention is directed to a method of producing a battery. The method comprises the steps of: a) disposing a first electrode and a second electrode within a battery can that includes a cell casing and a lid, the battery can being in electrical communication with the second electrode; b) forming a first terminal in electrical communication with the first electrode, and electrically insulated from the battery can; c) forming a second terminal, wherein at least a portion of the battery can is a component of the second terminal, or is electrically connected to the second terminal; and d) forming a CID in electrical communication with the battery can. The CID includes i) a first conductive plate in electrical communication with the second electrode; and ii) a second conductive plate in electrical communication with the first conductive plate. The second conductive plate separates from the first conductive plate when pressure inside the battery is greater than a predetermined value, whereby a current flow between the second electrode and the second terminal is interrupted.

In yet another embodiment, the present invention is directed to a battery pack comprising a plurality of cells, each of the cells have features as described above for the batteries of the invention.

In the batteries of the invention, at least a portion of the CID can be a part of, or external to, the battery can, because the CID is in electrical communication with the battery can, thereby minimizing the space occupied by the CID within the batteries. In addition, in some embodiments, a PTC layer typically in electrical communication with a negative terminal of the batteries, which is electrically insulated from the battery can, can be placed separately from the CID. This design allows additional space to be available within the battery can to accommodate more active cathode and anode materials (e.g., jelly rolls), thereby allowing higher capacity of the battery. This increase in cell capacity can be substantial especially in a battery pack containing a plurality of cells of the invention, and, especially, in prismatic cells. The batteries of the invention can be employed, for example, in personal computers, such as laptop computers, cell phones and hybrid vehicles.

DETAILED DESCRIPTION OF THE INVENTION

The foregoing will be apparent from the following more particular description of example embodiments of the invention, as illustrated in the accompanying drawings. The drawings are not necessarily to scale, emphasis instead being placed upon illustrating embodiments of the present invention.

As used herein, the "terminals" of the batteries of the invention mean the parts or surfaces of the batteries to which external electric circuits are connected.

The batteries of the invention typically include a first terminal in electrical communication with a first electrode, and a second terminal in electrical communication with a second electrode. The first and second electrodes are contained within the cell casing of a battery of the invention, for example, in a "jelly roll" form. The first terminal can be either a positive terminal in electrical communication with a positive electrode of the battery, or a negative terminal in electrical communication with a negative electrode of the battery, and vice versa for the second terminal. Preferably, the first terminal is a negative terminal in electrical communication with a negative electrode of the battery, and the second terminal is a positive terminal in electrical communication with a positive electrode of the battery.

As used herein, the phrase "electrically connected" or "in electrical communication" means certain parts are in communication with each other by flow of electrons through conductors, as opposed to electrochemical communication which involves flow of ions, such as $Li^+$, through electrolytes.

Figure 1:
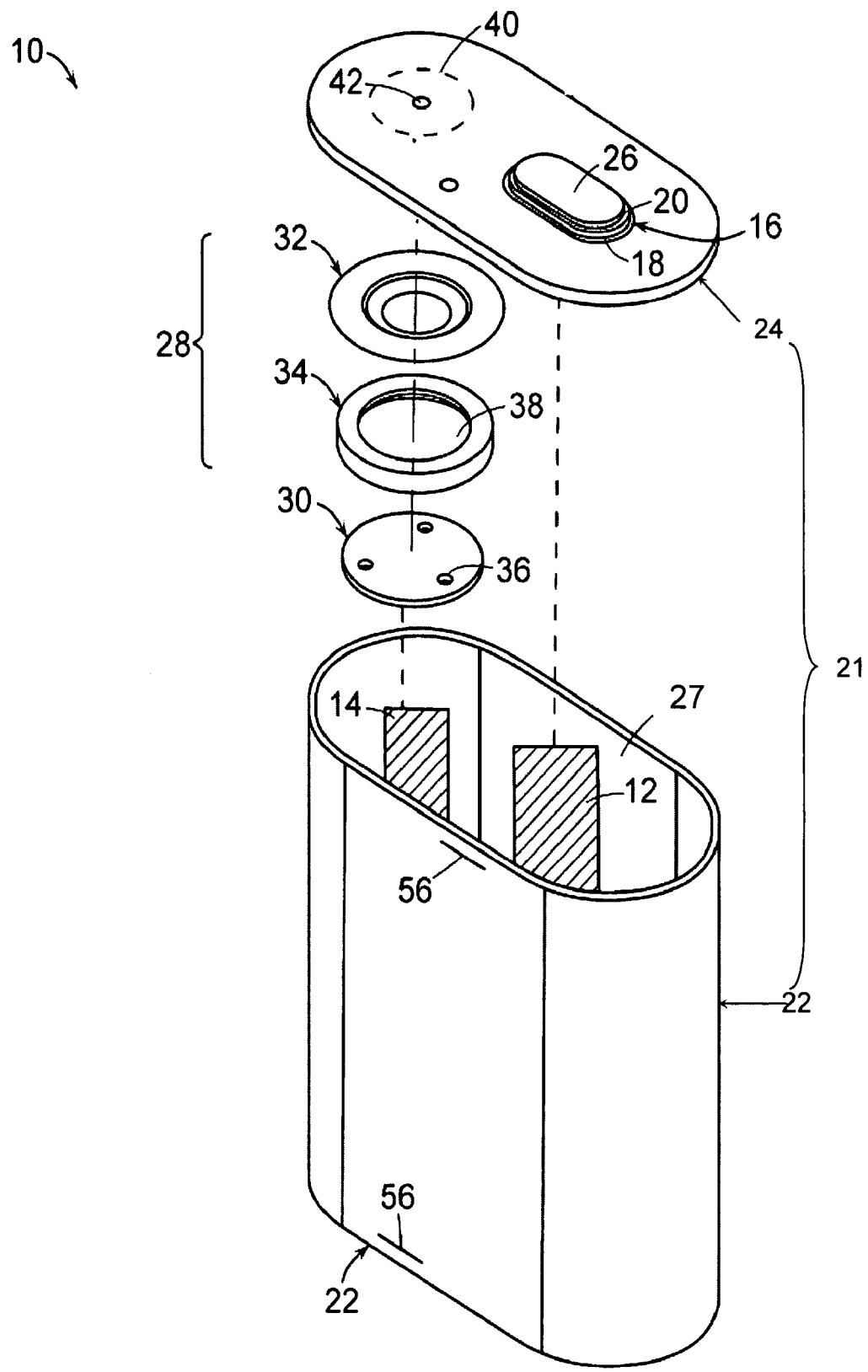
FIG. 1 is a schematic view of a prismatic battery of the invention.
Figure 2A:
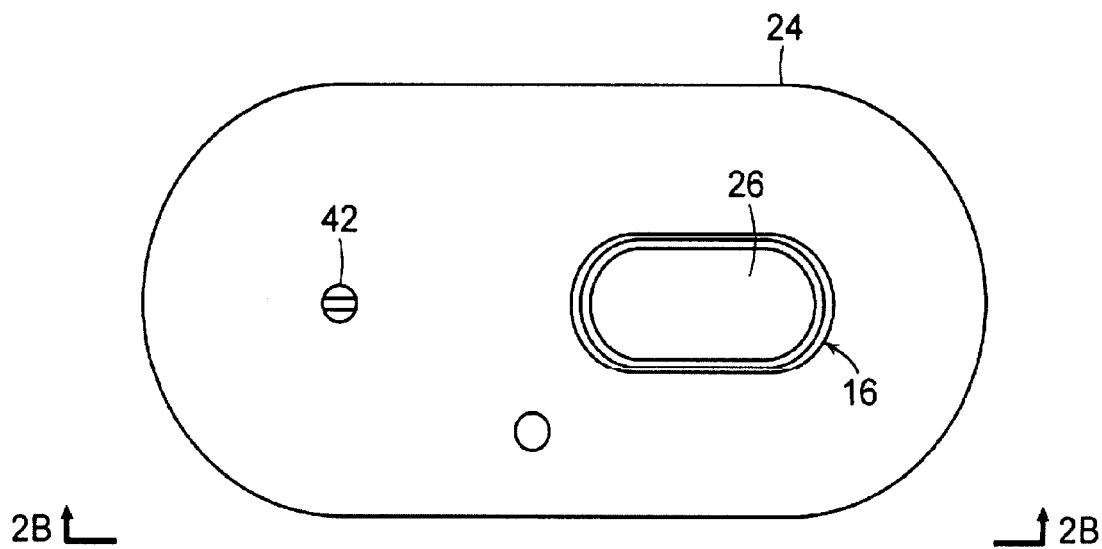
FIG. 2A shows a top view of a prismatic battery of the invention.
Figure 2B:
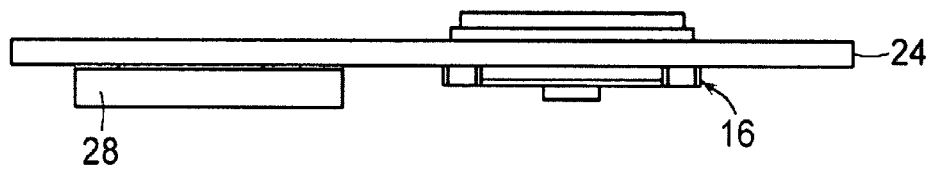
FIG. 2B shows a cross-sectional view of a prismatic battery of the invention.

FIG. 1 shows battery 10 of one embodiment of the invention. FIGS. 2A and 2B show a top view and cross-sectional view of battery 10, respectively.

As shown in FIG. 1, battery 10 includes first electrode 12 and second electrode 14. First electrode 12 is electrically connected to feed-through device 16, which includes first component 18, which is proximal to first electrode 12, and second component 20, which is distal to first electrode 12. The electrodes 12, 14 are placed inside battery can 21 that includes cell casing 22 and lid 24, i.e., internal space 27 defined by cell casing 22 and lid 24. Cell casing 22 and lid 24 of battery 10 are in electrical communication with each other.

As used herein, the term "feed-through" includes any material or device that connects electrode 12 of battery 10, within internal space 27 defined by cell casing 22 and lid 24, with a component of the battery external to that defined internal space. Preferably, feed-through device 16 extends through a pass-through hole defined by lid 24. Feed-through device 16 also can pass through lid 24 without deformation, such as bending, twisting and/or folding, and can increase cell capacity. One benefit of using such a feed-through device includes a potential increase (e.g., 5-15%) in cell capacity due to increased volume utilization, as compared to that of a conventional lithium battery in which current-carrying tabs are folded or bent into a cell casing and are welded with internal electrodes. Any other suitable means known in the art can be used in the invention to connect electrode 12 with a component of the battery external to battery can 21, e.g., a terminal of the battery.

Cell casing 22 and lid 24 can be made of any suitable conductive material which is essentially stable electrically and chemically at a given voltage of batteries, such as the lithium-ion batteries of the invention. Examples of suitable materials of cell casing 22 include aluminum, nickel, copper, steel, nickel-plated iron, stainless steel and combinations thereof. Preferably, cell casing 22 is of, or includes, aluminum. Examples of suitable materials of lid 24 are the same as those listed for cell casing 22. Preferably lid 24 is made of the same material as cell casing 22. In a more preferable embodiment, both cell casing 22 and lid 24 are formed of, or include, aluminum. Lid 24 can hermetically seal cell casing 22 by any suitable method known in the art. Preferably, lid 24 and cell casing 22 are welded to each other. Also, other forms of electrical connection of lid 24 to cell casing 22 known in the art, such as crimping, can be employed in the invention.

Battery can 21, for example, lid 24, is electrically insulated from feed-through device 16, for example, by an insulating gasket (not shown). The insulating gasket is formed of a suitable insulating material, such as polypropylene, polyvinylfluoride (PVF), etc.

At least one of cell casing 22 and lid 24 of battery can 21 are in electrical communication with second electrode 14 of battery 10 through CID 28. Battery can 21, i.e., cell casing 22 and lid 24, is electrically insulated from a first terminal of battery 10, and at least a portion of battery can 21 is at least a component of a second terminal of battery 10, or is electrically connected to the second terminal. In a preferred embodiment, at least a portion of lid 24 or the bottom of cell casing 22 serves as a second terminal of battery 10, and feed-through device 16 includes top conductive layer 26, which can serve as a first terminal of battery 10 in electrical communication with first electrode 12. First component 18, second component 20 and top conductive layer 26 each and independently can be made of any suitable conductive material known in the art, for example, nickel.

Battery 10 of the invention includes CID 28. Although one CID 28 is employed in battery 10, more than one CID 28 can be employed in the invention. CID 28 includes first conductive plate 30 and second conductive plate 32 in electrical communication with each other (e.g., by welding, crimping, riveting, etc.). First conductive plate 30 is in electrical communication with second electrode 14, and second conductive plate 32 is in electrical contact with battery can 21, for example, lid 24.

In CID 28, second conductive plate 32 separates from (e.g., deforms away or is detached from) first conductive plate 30 when gauge pressure inside the battery is greater than a predetermined value, for example, between about 5 $kg/cm^2$ and about 10 $kg/cm^2$, whereby a current flow between second electrode 14 and battery can 21, at least a portion of which is at least a component of a second terminal, or is electrically connected to the second terminal, is interrupted.

Preferably, when second conductive plate 32 separates from first conductive plate 30, no rupture occurs in second conductive plate 32 so that gas inside battery 10 does not go out through second conductive plate 32. The gas can exit battery 10 through one or more venting means 56 (e.g., at cell wall or the bottom part of cell casing 22, or second conductive plate 32), which will be discussed later in detail, when the internal pressure kept increasing and reaches a predetermined value for activation of venting means 56. In some embodiments, the predetermined gauge pressure value for activation of venting means 56, for example, between about 10 $kg/cm^2$ and about 20 kg/cm², is higher than that for activation of CID 28, for example, between about 5 kg/cm² and about 10 kg/cm². This feature helps prevent premature gas leakage, which can damage neighboring batteries (or cells) which are operating normally. So, when one of a plurality of cells in the battery packs of the invention is damaged, the other healthy cells are not damaged. It is noted that gauge pressure values or sub-ranges suitable for the activation of CID 28 and those for activation of venting means 56 are selected from among the predetermined gauge pressure ranges such that there is no overlap between the selected pressure values or sub-ranges. Preferably, the values or ranges of gauge pressure for the activation of CID 28 and those for the activation of venting means 56 differ by at least about 2 kg/cm² pressure difference, more preferably by at least about 4 kg/cm², even more preferably by at least about 6 kg/cm², such as by about 7 kg/cm².

In a preferred embodiment, CID 28 further includes insulator 34 (e.g., insulating layer or insulating gasket) between a portion of first conductive plate 30 and second conductive plate 32. CID 28 is in electrical communication with cell casing 22 of the battery. In CID 28, the second conductive plate separates from (e.g., deforms away or is detached from) the first conductive plate when pressure inside the battery is greater than a predetermined value, for example, an internal gauge pressure in a range of between about 5 kg/cm² and about 10 kg/cm², whereby a current flow between the second electrode and the second terminal is interrupted.

In another preferred embodiment, at least one of first conductive plate 30 and insulator 34 of CID 28 includes at least one hole (e.g., holes 36 or 38 in FIG. 1) through which gas within battery 10 is in fluid communication with second conductive plate 32.

In a specific embodiment, CID 28 further includes end plate 40 disposed over second conductive plate 32, and defining at least one hole 42 through which second conductive plate 32 is in fluid communication with the atmosphere outside the battery. In a more specific embodiment, end plate 40 is a part of battery can 21, as shown in FIG. 1 where end plate 40 is a part of lid 24 of battery can 21. In another more specific embodiment, end plate 40 is at battery can 21 of battery 10, for example, over, under or at lid 24 of battery can 21, and in electrical communication with battery can 21.

CID 28 in the invention is placed within battery can 21, or alternatively, a portion of CID 28 is within battery can 21 and another portion of CID 28 is at or above battery can 21. Alternatively, CID 28 can be electrically connected to lid 24 by any suitable means, such as welding, crimping, etc. In a specific embodiment, at least one component of CID 28, first and second conductive plates, 30, 32, insulator 34 and end plate 40, are positioned within battery can 21. In another specific embodiment, at least one component of CID 28, e.g., first and second conductive plates, 30, 32, insulator 34, and end plate 40, is seated within a recess at battery can 21, e.g., lid 24. In yet another specific embodiment, at least one of first and second conductive plates, 30, 32, and end plate 40, is a component of battery can 21, e.g., lid 24, or side or bottom of cell casing 22. In one more specific embodiment, at least one of first and second conductive plates, 30, 32, and end plate 40, is a portion of battery can 21, e.g., lid 24, or side or bottom of cell casing 22. Even more specifically, at least one of first and second conductive plates, 30, 32, and end plate 40, is coined or stamped at lid 24, or the side or the bottom of cell casing 22, preferably at lid 24. In another more specific embodiment, end plate 40 is a part of lid 24 (e.g., coined or stamped), and first and second conductive plates, 30, 32, are placed within cell casing 22, as shown in FIG. 1.

First conductive plate 30 and second conductive plate 32 can be made of any suitable conductive material known in the art for a battery. Examples of suitable materials include aluminum, nickel and copper, preferably aluminum. Preferably, battery can 21 (e.g., cell casing 22 and lid 24), first conductive plate 30 and second conductive plate 32 are made of substantially the same metals. As used herein, the term "substantially same metals" means metals that have substantially the same chemical and electrochemical stability at a given voltage, e.g., the operation voltage of a battery. More preferably, battery can 21, first conductive plate 30 and second conductive plate 32 are made of the same metal, such as aluminum.

Cell casing 22 (e.g., the cell wall or the bottom part) includes at least one venting means 56 as a means for venting interior space 27 when necessary, such as when gauge pressure within lithium ion battery 10 is greater than a value of between about 10 kg/cm² and about 20 kg/cm². In some embodiments, second conductive plate 32 includes at least one venting means 56 (not shown). It is to be understood that any suitable type of venting means can be employed as long as the means provide hermetic sealing in normal battery operation conditions. Various suitable examples of venting means are described in U.S. Provisional Application No. 60/717,898, filed on Sep. 16, 2005, the entire teachings of which are incorporated herein by reference.

Specific examples of venting means 56 include vent scores. As used herein, the term "score" means partial incision of section(s) of a cell casing, such as cell casing 22, that is designed to allow the cell pressure and any internal cell components to be released at a defined internal gauge pressure, (e.g., between about 10 and about 20 kg/cm²). Preferably, the vent score is directionally positioned away from a user/or neighboring cells. As shown, more than one vent score can be employed. In some embodiments, pattern vent scores can be employed. The vent score can be parallel, perpendicular, diagonal to a major stretching (or drawing) direction of the cell casing material during creation of the shape of cell casing 22. Consideration is also given to vent score properties, such as depth, shape and length (size).

The batteries of the invention can further include a positive thermal coefficient layer (PTC) in electrical communication with either the first terminal or the second terminal, preferably in electrical communication with the first terminal. Suitable PTC materials are those known in the art. Generally, suitable PTC materials are those that, when exposed to an electrical current in excess of a design threshold, its electrical conductivity decreases with increasing temperature by several orders of magnitude (e.g., $10^4$ to $10^6$ or more). Once the electrical current is reduced below a suitable threshold, in general, the PTC material substantially returns to the initial electrical resistivity. In one suitable embodiment, the PTC material includes small quantities of semiconductor material in a polycrystalline ceramic, or a slice of plastic or polymer with carbon grains embedded in it. When the temperature of the PTC material reaches a critical point, the semiconductor material or the plastic or polymer with embedded carbon grains forms a barrier to the flow of electricity and causes electrical resistance to increase precipitously. The temperature at which electrical resistivity precipitously increases can be varied by adjusting the composition of the PTC material, as is known in the art. An "operating temperature" of the PTC material is a temperature at which the PTC exhibits an electrical resistivity about halfway between its highest and lowest electrical resistance. Preferably, the operating temperature of the PTC layer employed in the invention is between about 70° Celsius and about 150° Celsius.

Examples of specific PTC materials include polycrystalline ceramics containing small quantities of barium titanate ($BaTiO_3$), and polyolefins including carbon grains embedded therein. Examples of commercially available PTC laminates that include a PTC layer sandwiched between two conducting metal layers include LTP and LR4 series manufactured by Raychem Co. Generally, the PTC layer has a thickness in a range of about 50 μm and about 300 μm.

Preferably, the PTC layer includes electrically conductive surface, the total area of which is at least about 25% or at least about 50% (e.g., about 48% or about 56%) of the total surface area of lid 24 or the bottom of battery 10. The total surface area of the electrically conductive surface of the PTC layer can be at least about 56% of the total surface area of lid 24 or the bottom of battery 10. Up to 100% of the total surface area of lid 24 of battery 10 can be occupied by the electrically conductive surface of the PTC layer. Alternatively, the whole, or part, of the bottom of battery 10 can be occupied by the electrically conductive surface of the PTC layer.

The PTC layer can be positioned internally or externally to the cell can (e.g., lid 24 or the bottom part of cell casing 22), preferably externally to the cell can, for example, over lid 24 of the cell can.

In a preferred embodiment, the PTC layer is between a first conductive layer and a second conductive layer and at least a portion of the second conductive layer is at least a component of the first terminal, or is electrically connected to the first terminal. In a more preferred embodiment, the first conductive layer is connected to the feed-through device. Suitable examples of such a PTC layer sandwiched between the first and second conductive layers are described in U.S. patent application Ser. No. 11/474,081, filed on Jun. 23, 2006, the entire teachings of which are incorporated herein by reference.

Preferably, the cells of batteries of the invention are rechargeable, such as rechargeable lithium-ion cells or batteries.

Figure 4A:
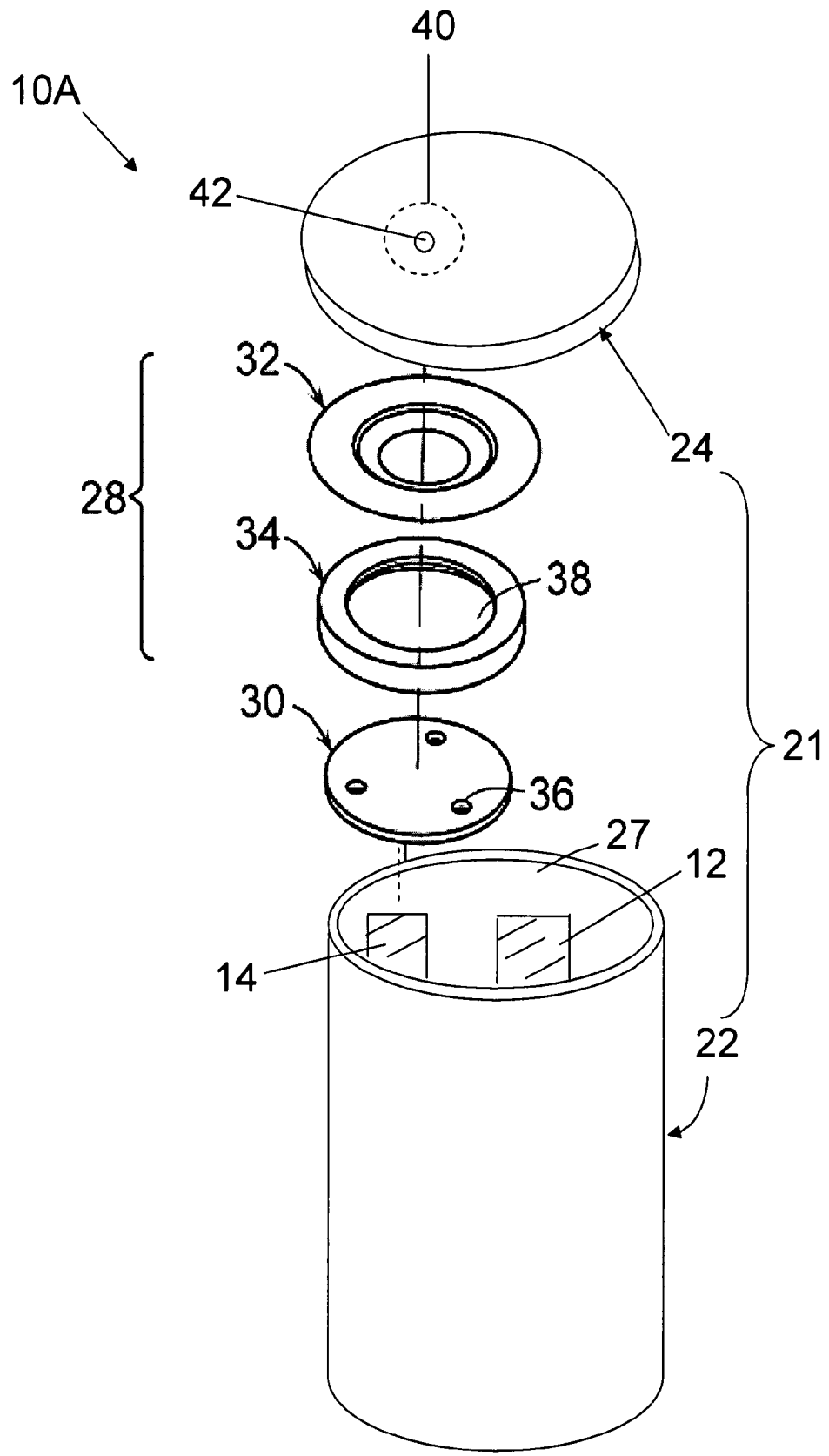
FIG. 4A is a schematic view of a cylindrical battery of the invention.
Figure 4B:
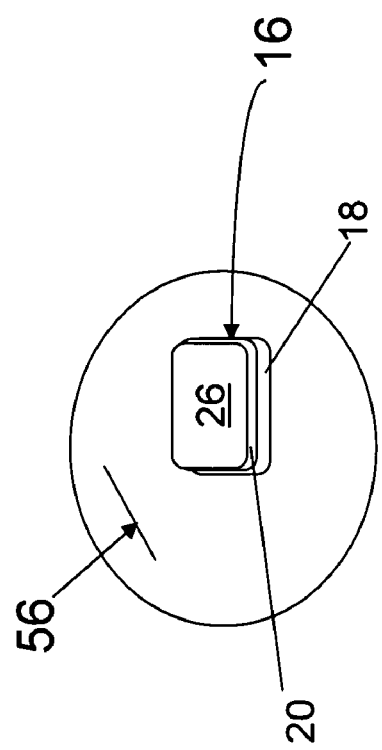
FIG. 4B shows a bottom view of the bottom part of the cylindrical battery of FIG. 4A.

The cells or batteries of the invention can be in any suitable shape, e.g., cylindrical or prismatic. In some embodiments, the cells of batteries of the invention are cylindrical (e.g., 26650, 18650, or 14500 configuration), as shown in FIGS. 4A and 4B. FIG. 4B shows the bottom part of cell casing 22 of battery 10A of FIG. 4A. In these embodiments, preferably, conductive layer 26 at feed-through device 16, which is in electrical communication with first electrode 12, is placed at the bottom part of cell casing 22, as shown in FIG. 4B. Conductive layer 26 can serve as a first terminal of battery 10A. In these embodiments, preferably, at least one venting means 56 is placed at the bottom part of cell casing 22 (see FIG. 4B). Alternatively, venting means 56 can be placed at second conductive plate 32 (not shown). Features of each component of cylindrical battery 10A, including preferred features, are as described above for battery 10.

In some other embodiments, the cells or batteries of the invention are prismatic, as shown in FIG. 1 (stacked or wound, e.g., 183665 or 103450 configuration). Preferably, the cells or batteries of the invention are of a prismatic shape that is oblong. Although the present invention can use all types of prismatic cell casings, an oblong cell casing is preferred partly due to the two features described below.

The available internal volume of an oblong shape, such as the 183665 form factor, is larger than the volume of two 18650 cells, when comparing stacks of the same external volume. When assembled into a battery pack, the oblong cell fully utilizes more of the space that is occupied by the battery pack. This enables novel design changes to the internal cell components that can increase key performance features without sacrificing cell capacity relative to that found in the industry today. Due to the larger available volume, one can elect to use thinner electrodes, which have relatively higher cycle life and a higher rate capability. Furthermore, an oblong can has larger flexibility. For instance, an oblong shape can flex more at the waist point compared to a cylindrically shaped can, which allows less flexibility as stack pressure is increasing upon charging. The increased flexibility decreases mechanical fatigue on the electrodes, which, in turn, causes higher cycle life. Also, clogging of pores of a separator in batteries can be improved by the relatively lower stack pressure.

A particularly desired feature, allowing relatively higher safety, is available for the oblong shaped battery compared to the prismatic battery. The oblong shape provides a snug fit to the jelly roll, which minimizes the amount of electrolyte necessary for the battery. The relatively lower amount of electrolyte results in less available reactive material during a misuse scenario and hence higher safety. In addition, cost is lower due to a lower amount of electrolyte. In the case of a prismatic can with a stacked electrode structure, whose cross-section is in a rectangular shape, full volume utilization is possible without unnecessary electrolyte, but this type of can design is more difficult and hence more costly from a manufacturing point-of-view.

Figure 3:
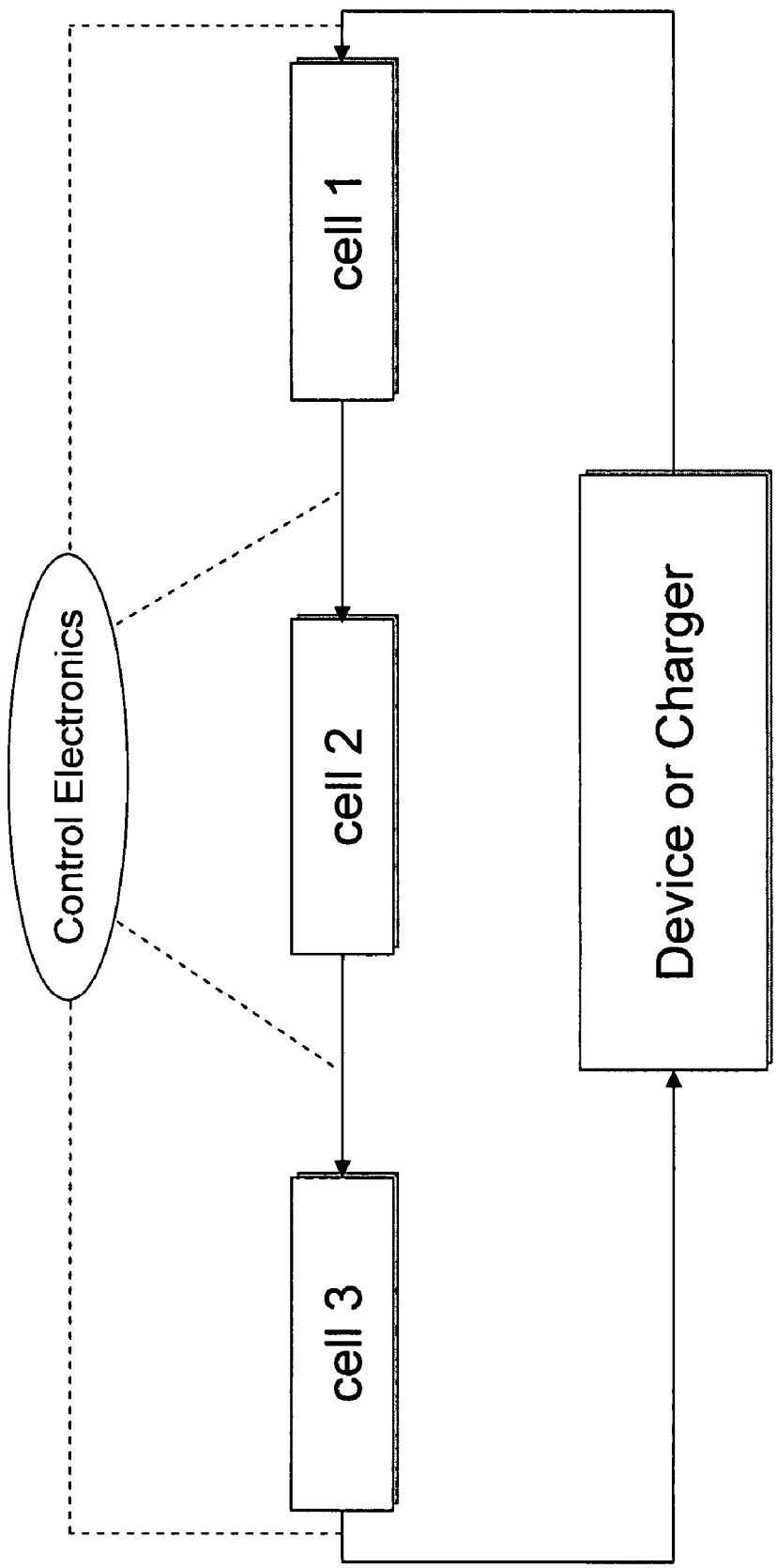
FIG. 3 is a schematic circuitry showing how individual cells in the invention are preferably connected when arranged together in a battery pack of the invention.

Referring to FIG. 3, in some embodiments of the invention, a plurality of lithium-ion batteries of the invention (e.g., 2 to 5 cells) can be connected in a battery pack, wherein each of the batteries (cells) is connected with each other in series, parallel, or in series and parallel. In some battery packs of the invention, there are no parallel connections between the batteries.

Preferably, at least one cell has a prismatic shaped cell casing, and more preferably, an oblong shaped cell casing, as shown in FIG. 1. More preferably, at least one cell has an 183665 configuration. Preferably, the capacity of the cells in the battery pack is typically equal to or greater than about 3.0 Ah, more preferably equal to or greater than about 4.0 Ah. The internal impedance of the cells is preferably less than about 50 milliohms, and more preferably less than 30 milliohms.

The lithium-ion batteries and battery packs of the invention can be used for portable power devices, such as portable computers, power tools, toys, portable phones, camcorders, PDAs and the like. In the portable electronic devices using lithium-ion batteries, their charges are, in general, designed for a 4.20 V charging voltage. Thus, the lithium-ion batteries and battery packs of the invention are particularly useful for these portable electronic devices.

The present invention also includes methods of producing a battery, such as a lithium-ion battery, as described above. The methods include forming a cell casing as described above, and disposing a first electrode and a second electrode within the cell casing. A current interrupt device, as described above (e.g., current interrupt device 28), is formed and electrically connected with the cell casing.

Positive and negative electrodes and electrolytes for the lithium-ion batteries of the invention can be formed by suitable methods known in the art.

Examples of suitable negative-active materials for the negative electrodes include any material allowing lithium to be doped or undoped in or from the material. Examples of such materials include carbonaceous materials, for example, non-graphitic carbon, artificial carbon, artificial graphite, natural graphite, pyrolytic carbons, cokes such as pitch coke, needle coke, petroleum coke, graphite, vitreous carbons, or a heat-treated organic polymer compounds obtained by carbonizing phenol resins, furan resins, or similar, carbon fibers, and activated carbon. Further, metallic lithium, lithium alloys, and an alloy or compound thereof are usable as the negative active materials. In particular, the metal element or semiconductor element allowed to form an alloy or compound with lithium may be a group IV metal element or semiconductor element, such as but not limited to, silicon or tin. In particular, amorphous tin that is doped with a transition metal, such as cobalt or iron/nickel, is a metal that is suitable as an anode material in these types of batteries. Oxides allowing lithium to be doped or undoped in or out from the oxide at a relatively basic potential, such as iron oxide, ruthenium oxide, molybdenum oxide, tungsten oxide, titanium oxide, and tin oxide, and nitrides, similarly, are usable as the negative-active materials.

Suitable positive-active materials for the positive electrodes include any material known in the art, for example, lithium nickelate (e.g., $Li_{1+x}NiM'O_2$), lithium cobaltate (e.g., $Li_{1+x}CoO_2$), olivine-type compounds (e.g., $Li_{1+x}FePO_4$), manganate spinel (e.g., $Li_{1+x9}Mn_{2-y9}O_4$ (x9 and y9 are each independently equal to or greater than zero and equal to or less than 0.3) or $Li_{1+x1}(Mn_{1-y1}A'_{y2})_{2-x2}O_{z1})$ (x1 and x2 are each independently equal to or greater than 0.01 and equal to or less than 0.3; y1 and y2 are each independently equal to or greater than 0.0 and equal to or less than 0.3; z1 is equal to or greater than 3.9 and equal to or less than 4.1), and mixtures thereof. Various examples of suitable positive-active materials can be found in international application No. PCT/US2005/047383, filed on Dec. 23, 2005, U.S. patent application Ser. No. 11/485,068, file on Jul. 12, 2006, and International Application, filed on Jun. 22, 2007 under U.S. Ser. No. 12/317,487, entitled "Lithium-Ion Secondary Battery", the entire teachings of all of which are incorporated herein by reference.

In one specific embodiment, the positive-active materials for the positive electrodes of the invention include a lithium cobaltate, such as $Li_{(1+x8)}CoO_{z8}$. More specifically, a mixture of about 60-90 wt % (e.g. about 80 wt %) of a lithium cobaltate, such as $Li_{(1+x8)}CoO_{z8}$, and about 40-10 wt % (e.g., about 20 wt %) of a manganate spinel (e.g., having about 100-115 mAh/g), such as $Li_{(1+x1)}Mn_2O_{z1}$, preferably $Li_{(1+x1)}Mn_2O_4$, is employed for the invention. The value x1 is equal to or greater than zero and equal to or less than 0.3 (e.g., $0.05 \leq x1 \leq 0.15$). The value z1 is equal to or greater than 3.9 and equal to or greater than 4.2. The value x8 is equal to or greater than zero and equal to or less than 0.2. The value z8 is equal to or greater than 1.9 and equal to or greater than 2.1.

In another specific embodiment, the positive-active materials for the invention include a mixture that includes a lithium cobaltate, such as $Li_{(1+x8)}CoO_{z8}$, and a manganate spinel represented by an empirical formula of $Li_{(1+x1)}(Mn_{1-y1}A'_{y2})_{2-x2}O_{z1}$. The values x1 and x2 are each independently equal to or greater than 0.01 and equal to or less than 0.3. The values y1 and y2 are each independently equal to or greater than 0.0 and equal to or less than 0.3. The value z1 is equal to or greater than 3.9 and equal to or less than 4.2. A' is at least one member of the group consisting of magnesium, aluminum, cobalt, nickel and chromium. More specifically, the lithium cobaltate and the manganate spinel are in a weight ratio of lithium cobaltate:manganate spinel between about 0.95:0.05 and about 0.9:0.1 to about 0.6:0.4.

In yet another specific embodiment, the positive-active materials for the invention include a mixture that includes 100% of a lithium cobaltate, such as $Li_{(1+x8)}CoO_{z8}$.

In yet another specific embodiment, the positive-active materials for the invention include at least one lithium oxide selected from the group consisting of: a) a lithium cobaltate; b) a lithium nickelate; c) a manganate spinel represented by an empirical formula of $Li_{(1+x1)}(Mn_{1-y1}A'_{y2})_{2-x2}O_{z1}$; d) a manganate spinel represented by an empirical formula of $Li_{(1+x1)}Mn_2O_{z1}$ or $Li_{1+x9}Mn_{2-y9}O_4$; and e) an olivine compound represented by an empirical formula of $Li_{(1-x10)}A''_{x10}MPO_4$. The values of x1, z1, x9 and y9 are as described above. The value, x2, is equal to or greater than 0.01 and equal to or less than 0.3. The values of y1 and y2 are each independently equal to or greater than 0.0 and equal to or less than 0.3. A' is at least one member of the group consisting of magnesium, aluminum, cobalt, nickel and chromium. The value, x10, is equal to or greater than 0.05 and equal to or less than 0.2, or the value, x10, is equal to or greater than 0.0 and equal to or less than 0.1. M is at least one member of the group consisting of iron, manganese, cobalt and magnesium. A'' is at least one member of the group consisting of sodium, magnesium, calcium, potassium, nickel and niobium.

A lithium nickelate that can be used in the invention includes at least one modifier of either the Li atom or Ni atom, or both. As used herein, a "modifier" means a substituent atom that occupies a site of the Li atom or Ni atom, or both, in a crystal structure of $LiNiO_2$. In one embodiment, the lithium nickelate includes only a modifier of, or substituent for, Li atoms ("Li modifier"). In another embodiment, the lithium nickelate includes only a modifier of, or substituent for, Ni atoms ("Ni modifier"). In yet another embodiment, the lithium nickelate includes both the Li and Ni modifiers. Examples of Li modifiers include barium (Ba), magnesium (Mg), calcium (Ca) and strontium (Sr). Examples of Ni modifiers include those modifiers for Li and, in addition, aluminum (Al), manganese (Mn) and boron (B). Other examples of Ni modifiers include cobalt (Co) and titanium (Ti). Preferably, the lithium nickelate is coated with $LiCoO_2$. The coating can be, for example, a gradient coating or a spot-wise coating.

One particular type of a lithium nickelate that can be used in the invention is represented by an empirical formula of $Li_{x3}Ni_{1-z3}M'_{z3}O_2$ where $0.05 < x3 < 1.2$ and $0 < z3 < 0.5$, and M' is one or more elements selected from a group consisting of Co, Mn, Al, B, Ti, Mg, Ca and Sr. Preferably, M' is one or more elements selected from a group consisting of Mn, Al, B, Ti, Mg, Ca and Sr.

Another particular type of a lithium nickelate that can be used in the invention is represented by an empirical formula of $Li_{x4}A*_{x5}Ni_{(1-y4-z4)}Co_{y4}Q_{z4}O_a$ where x4 is equal to or greater than about 0.1 and equal to or less than about 1.3; x5 is equal to or greater than 0.0 and equal to or less than about 0.2; y4 is equal to or greater than 0.0 and equal to or less than about 0.2; z4 is equal to or greater than 0.0 and equal to or less than about 0.2; a is greater than about 1.5 and less than about 2.1; A* is at least one member of the group consisting of barium (Ba), magnesium (Mg) and calcium (Ca); and Q is at least one member of the group consisting of aluminum (Al), manganese (Mn) and boron (B). Preferably, y4 is greater than zero. In one preferred embodiment, x5 is equal to zero, and z4 is greater than 0.0 and equal to or less than about 0.2. In another embodiment, z4 is equal to zero, and x5 is greater than 0.0 and equal to or less than about 0.2. In yet another embodiment, x5 and z4 are each independently greater than 0.0 and equal to or less than about 0.2. In yet another embodiment, x5, y4 and z4 are each independently greater than 0.0 and equal to or less than about 0.2. Various examples of lithium nickelates where x5, y4 and z4 are each independently greater than 0.0 and equal to or less than about 0.2, can be found in U.S. Pat. Nos. 6,855,461 and 6,921,609 (the entire teachings of which are incorporated herein by reference).

A specific example of the lithium nickelate is $LiNi_{0.8}Co_{0.15}Al_{0.05}O_2$. A preferred specific example is $LiCoO_2$-coated $LiNi_{0.8}Co_{0.15}Al_{0.05}O_2$. In a spot-wise coated cathode, $LiCoO_2$ doe not fully coat the nickelate core particle.

The composition of $LiNi_{0.8}Co_{0.15}Al_{0.05}O_2$ coated with $LiCoO_2$ can naturally deviate slightly in composition from the 0.8:0.15:0.05 weight ratio between Ni:Co:Al. The deviation can range about 10-15% for the Ni, 5-10% for Co and 2-4% for Al. Another specific example of the lithium nickelate is $Li_{0.97}Mg_{0.03}Ni_{0.9}Cu_{0.1}O_2$. A preferred specific example is $LiCoO_2$-coated $Li_{0.97}Mg_{0.03}Ni_{0.9}Cu_{0.1}O_2$. The composition of $Li_{0.97}Mg_{0.03}Ni_{0.9}Cu_{0.1}O_2$ coated with $LiCoO_2$ can deviate slightly in composition from the 0.03:0.9:0.1 weight ratio between Mg:Ni:Co. The deviation can range about 2-4% for Mg, 10-15% for Ni and 5-10% for Co. Another preferred nickelate that can be used in the present invention is $Li(Ni_{1/3}Co_{1/3}Mn_{1/3})O_2$, also called "333-type nickelate." This 333-type nickelate optionally can be coated with $LiCoO_2$, as described above.

Suitable examples of lithium cobaltates that can be used in the invention include $Li_{1+x8}CoO_2$ that is modified by at least one of Li or Co atoms. Examples of the Li modifiers are as described above for Li of lithium nickelates. Examples of the Co modifiers include the modifiers for Li and aluminum (Al), manganese (Mn) and boron (B). Other examples include nickel (Ni) and titanium (Ti) and, in particular, lithium cobaltates represented by an empirical formula of $Li_{x6}M'_{(1-y6)}Co_{(1-z6)}M''_{z6}O_2$, where x6 is greater than 0.05 and less than 1.2; y6 is equal to or greater than 0 and less than 0.1, z6 is equal to or greater than 0 and less than 0.5; M' is at least one member of magnesium (Mg) and sodium (Na) and M'' is at least one member of the group consisting of manganese (Mn), aluminum (Al), boron (B), titanium (Ti), magnesium (Mg), calcium (Ca) and strontium (Sr), can be used in the invention. Another example of a lithium cobaltate that can be used in the invention is unmodified $Li_{1+8}CoO_2$, such as $LiCoO_2$. In one specific embodiment, the lithium cobaltate (e.g., $LiCoO_2$) doped with Mg and/or coated with a refractive oxide or phosphate, such as $ZrO_2$ or $Al(PO_4)$.

It is particularly preferred that lithium oxide compounds employed have a spherical-like morphology, since it is believed that this improves packing and other production-related characteristics.

Preferably, a crystal structure of each of the lithium cobaltate and lithium nickelate is independently a R-3m type space group (rhombohedral, including distorted rhombohedral). Alternatively, a crystal structure of the lithium nickelate can be in a monoclinic space group (e.g., P2/m or C2/m). In a R-3m type space group, the lithium ion occupies the "3a" site (x=0, y=0 and z=0) and the transition metal ion (i.e., Ni in a lithium nickelate and Co in a lithium cobaltate) occupies the "3b" site (x=0, y=0, z=0.5). Oxygen is located in the "6a" site (x=0, y=0, z=z0, where z0 varies depending upon the nature of the metal ions, including modifier(s) thereof).

Examples of olivine compounds that are suitable for use in the invention are generally represented by a general formula $Li_{1-x2}A''_{x2}MPO_4$, where x2 is equal to or greater than 0.05, or x2 is equal to or greater than 0.0 and equal to or greater than 0.1; M is one or more elements selected from a group consisting of Fe, Mn, Co, or Mg; and A'' is selected from a group consisting of Na, Mg, Ca, K, Ni, Nb. Preferably, M is Fe or Mn. More preferably, $LiFePO_4$ or $LiMnPO_4$, or both are used in the invention. In a preferred embodiment, the olivine compounds are coated with a material having relatively high electrical conductivity, such as carbon. In a more preferred embodiment, carbon-coated $LiFePO_4$ or carbon-coated $LiMnPO_4$ is employed in the invention. Various examples of olivine compounds where M is Fe or Mn can be found in U.S. Pat. No. 5,910,382 (the entire teachings of which are incorporated herein by reference).

The olivine compounds typically have a small change in crystal structure upon charging/discharging, which generally makes the olivine compounds superior in terms of cycle characteristics. Also, safety is generally high, even when a battery is exposed to a high temperature environment. Another advantage of olivine compounds (e.g., $LiFePO_4$ and $LiMnPO_4$) is their relatively low cost.

Manganate spinel compounds have a manganese base, such as $LiMn_2O_4$. While the manganate spinel compounds typically have relatively low specific capacity (e.g., in a range of about 110 to 115 mAh/g), they have relatively high power delivery when formulated into electrodes and typically are safe in terms of chemical reactivity at higher temperatures. Another advantage of the manganate spinel compounds is their relatively low cost.

One type of manganate spinel compounds that can be used in the invention is represented by an empirical formula of $Li_{(1+x1)}(Mn_{1-y1}A'_{y2})_{2-x2}O_{z1}$, where A' is one or more of Mg, Al, Co, Ni and Cr; x1 and x2 are each independently equal to or greater than 0.01 and equal to or less than 0.3; y1 and y2 are each independently equal to or greater than 0.0 and equal to or less than 0.3; z1 is equal to or greater than 3.9 and equal to or less than 4.1. Preferably, A' includes a $M^{3+}$ ion, such as $Al^{3+}$, $Co^{3+}$, $Ni^{3+}$ and $Cr^{3+}$, more preferably $Al^{3+}$. The manganate spinel compounds of $Li_{(1+x1)}(Mn_{1-y1}A'_{y2})_{2-x2}O_{z1}$ can have enhanced cyclability and power compared to those of $LiMn_2O_4$. Another type of manganate spinel compounds that can be used in the invention is represented by an empirical formula of $Li_{(1+x1)}Mn_2O_{z1}$, where x1 and z1 are each independently the same as described above. Alternatively, the manganate spinel for the invention includes a compound represented by an empirical formula of $Li_{1+x9}Mn_{2-y9}O_{z9}$ where x9 and y9 are each independently equal to or greater than 0.0 and equal to or less than 0.3 (e.g., $0.05 \leq x9$, $y9 \leq 0.15$); and z9 is equal to or greater than 3.9 and equal to or less than 4.2. Specific examples of the manganate spinel that can be used in the invention include $LiMn_{1.9}Al_{0.1}O_4$, $Li_{1+x1}Mn_2O_4$, $Li_{1+x7}Mn_{2-y7}O_4$, and their variations with Al and Mg modifiers. Various other examples of manganate spinel compounds of the type $Li_{(1+x1)}(Mn_{1-y1}A'_{y2})_{2-x2}O_{z1}$ can be found in U.S. Pat. Nos. 4,366,215; 5,196,270; and 5,316,877 (the entire teachings of which are incorporated herein by reference).

It is noted that the suitable cathode materials described herein are characterized by empirical formulas that exist upon manufacture of lithium-ion batteries in which they are incorporated. It is understood that their specific compositions thereafter are subject to variation pursuant to their electrochemical reactions that occur during use (e.g., charging and discharging).

Examples of suitable non-aqueous electrolytes include a non-aqueous electrolytic solution prepared by dissolving an electrolyte salt in a non-aqueous solvent, a solid electrolyte (inorganic electrolyte or polymer electrolyte containing an electrolyte salt), and a solid or gel-like electrolyte prepared by mixing or dissolving an electrolyte in a polymer compound or the like.

The non-aqueous electrolytic solution is typically prepared by dissolving a salt in an organic solvent. The organic solvent can include any suitable type that has been generally used for batteries of this type. Examples of such organic solvents include propylene carbonate (PC), ethylene carbonate (EC), diethyl carbonate (DEC), dimethyl carbonate (DMC), 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. It is preferred to use cyclic carbonates such as propylene carbonate, or chain carbonates such as dimethyl carbonate and diethyl carbonate. These organic solvents can be used singly or in a combination of two types or more.

Additives or stabilizers may also be present in the electrolyte, such as VC (vinyl carbonate), VEC (vinyl ethylene carbonate), EA (ethylene acetate), TPP (triphenylphosphate), phosphazenes, biphenyl (BP), cyclohexylbenzene (CHB), 2,2-diphenylpropane (DP), lithium bis(oxalato)borate (LiBoB), ethylene sulfate (ES) and propylene sulfate. These additives are used as anode and cathode stabilizers, flame retardants or gas releasing agents, which may make a battery have higher performance in terms of formation, cycle efficiency, safety and life.

The solid electrolyte can include an inorganic electrolyte, a polymer electrolyte and the like insofar as the material has lithium-ion conductivity. The inorganic electrolyte can include, for example, lithium nitride, lithium iodide and the like. The polymer electrolyte is composed of an electrolyte salt and a polymer compound in which the electrolyte salt is dissolved. Examples of the polymer compounds used for the polymer electrolyte include ether-based polymers such as polyethylene oxide and cross-linked polyethylene oxide, polymethacrylate ester-based polymers, acrylate-based polymers and the like. These polymers may be used singly, or in the form of a mixture or a copolymer of two kinds or more.

A matrix of the gel electrolyte may be any polymer insofar as the polymer is gelated by absorbing the above-described non-aqueous electrolytic solution. Examples of the polymers used for the gel electrolyte include fluorocarbon polymers such as polyvinylidene fluoride (PVDF), polyvinylidene-co-hexafluoropropylene (PVDF-HFP) and the like.

Examples of the polymers used for the gel electrolyte also include polyacrylonitrile and a copolymer of polyacrylonitrile. Examples of monomers (vinyl based monomers) used for copolymerization include vinyl acetate, methyl methacrylate, butyl methacylate, methyl acrylate, butyl acrylate, itaconic acid, hydrogenated methyl acrylate, hydrogenated ethyl acrylate, acrlyamide, vinyl chloride, vinylidene fluoride, and vinylidene chloride. Examples of the polymers used for the gel electrolyte further include acrylonitrile-butadiene copolymer rubber, acrylonitrile-butadiene-styrene copolymer resin, acrylonitrile-chlorinated polyethylene-propylene-diene-styrene copolymer resin, acrylonitrile-vinyl chloride copolymer resin, acrylonitrile-methacylate resin, and acrylonitrile-acrylate copolymer resin.

Examples of the polymers used for the gel electrolyte include ether based polymers such as polyethylene oxide, copolymer of polyethylene oxide, and cross-linked polyethylene oxide. Examples of monomers used for copolymerization include polypropylene oxide, methyl methacrylate, butyl methacylate, methyl acrylate, butyl acrylate.

In particular, from the viewpoint of oxidation-reduction stability, a fluorocarbon polymer is preferably used for the matrix of the gel electrolyte.

The electrolyte salt used in the electrolyte may be any electrolyte salt suitable for batteries of this type. Examples of the electrolyte salts include $LiClO_4$, $LiAsF_6$, $LiPF_6$, $LiBF_4$, $LiB(C_6H_5)_4$, $LiB(C_2O_4)_2$, $CH_3SO_3Li$, $CF_3SO_3Li$, LiCl, LiBr and the like. Generally, a separator separates the positive electrode from the negative electrode of the batteries. The separator can include any film-like material having been generally used for forming separators of non-aqueous electrolyte secondary batteries of this type, for example, a microporous polymer film made from polypropylene, polyethylene, or a layered combination of the two. In addition, if a solid electrolyte or gel electrolyte is used as the electrolyte of the battery, the separator does not necessarily need to be provided. A microporous separator made of glass fiber or cellulose material can in certain cases also be used. Separator thickness is typically between 9 and 25 μm.

In some specific embodiments, a positive electrode can be produced by mixing the cathode powders at a specific ratio. 90 wt % of this blend is then mixed together with 5 wt % of acetylene black as a conductive agent, and 5 wt % of PVDF as a binder. The mix is dispersed in N-methyl-2-pyrrolidone (NMP) as a solvent, in order to prepare slurry. This slurry is then applied to both surfaces of an aluminum current collector foil, having a typical thickness of about 20 um, and dried at about 100-150° C. The dried electrode is then calendared by a roll press, to obtain a compressed positive electrode. When $LiCoO_2$ is solely used as the positive electrode a mixture using 94 wt % $LiCoO_2$, 3% acetylene black, and 3% PVDF is typically used. A negative electrode can be prepared by mixing 93 Wt % of graphite as a negative active material, 3 wt % acetylene black, and 4 wt % of PVDF as a binder. The negative mix was also dispersed in N-methyl-2-pyrrolidone as a solvent, in order to prepare the slurry. The negative mix slurry was uniformly applied on both surfaces of a strip-like copper negative current collector foil, having a typical thickness of about 10 um. The dried electrode is then calendared by a roll press to obtain a dense negative electrode.

The negative and positive electrodes and a separator formed of a polyethylene film with micro pores, of thickness 25 um, are generally laminated and spirally wound to produce a spiral type electrode element.

In some embodiments, one or more positive lead strips, made of, e.g., aluminum, are attached to the positive current electrode, and then electrically connected to the positive terminal of the batteries of the invention. A negative lead, made of, e.g., nickel metal, connects the negative electrode, and then attached to a feed-through device, such as feed-through device 16. An electrolyte of for instance EC:DMC:DEC with 1M $LiPF_6$, is vacuum filled in the cell casing of a lithium-ion battery of the invention, where the cell casing has the spirally wound "jelly roll."

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:
1. A battery, comprising:
   a) a first terminal in electrical communication with a first electrode of the battery, wherein the first terminal is a negative terminal;
   b) a second terminal in electrical communication with a second electrode of the battery, wherein the second terminal in a positive terminal;
   c) a battery can that includes aluminum and is electrically insulated from the first terminal, wherein at least a portion of the battery can is at least a component of the second terminal, or is electrically connected to the second terminal, the battery can including a cell casing and a lid which are in electrical communication with each other; and
   d) at least one current interrupt device in electrical communication with the battery can, the current interrupt device including, i) a first conductive plate, composed at least in part of aluminum, in electrical communication with the second electrode; and ii) a second conductive plate, composed at least in part of aluminum, in electrical communication with the first conductive plate and with the lid of the battery can, wherein the first conductive plate is between the second electrode and the second conductive plate, and in electrical communication with the lid through the second conductive plate, and in electrical communication with the lid through the second conductive plate, wherein the second conductive plate separates from the first conductive plate without rupturing when pressure inside the battery is greater than a predetermined value, whereby a current flow between the second electrode and the second terminal is interrupted.

2. The battery of claim 1, wherein the first terminal is a negative terminal and the second terminal is a positive terminal.

3. The battery of claim 1, wherein the second conductive plate is in fluid communication with the atmosphere outside the battery.

4. The battery of claim 3, further includes an end plate disposed over the second conductive plate and defining at least one hole through which the second conductive plate is in communication with the atmosphere outside the battery.

5. The battery of claim 4, wherein the end plate is a part of the battery can, and wherein the first and second conductive plates are within the battery can.

6. The battery of claim 4, wherein the end plate is at the battery can.

7. The battery of claim 4, wherein at least a portion of the current interrupt device is seated within a recess at the lid of the battery can.

8. The battery of claim 1, wherein at least a portion of the current interrupt device is a component or a portion of the battery can.

9. The battery of claim 1, wherein at least a portion of the current interrupt device is coined or stamped at the battery can.

10. The battery of claim 1, wherein the first terminal is at the lid of the battery can or the bottom of the cell casing.

11. The battery of claim 10, wherein the current interrupt device is at the lid of the battery can.

12. The battery of claim 11, further includes an end plate disposed over the second conductive plate and defining at least one hole through which the second conductive plate is in fluid communication with the atmosphere outside the battery.

13. The battery of claim 1, wherein at least one of the first and second conductive plates has at least one protrusion at which the first and second conductive plates are in electrical communication with each other.

14. The battery of claim 1, wherein at least one of the first conductive plate and the second conductive plate further includes at least one metal selected from the group consisting of nickel and copper.

15. The battery of claim 1, wherein the cell casing of the battery can has a prismatic cross-sectional shape, or cylindrical shape.

16. The battery of claim 1, wherein the battery is rechargeable.

17. The battery of claim 1, further including a positive thermal coefficient layer in electrical communication with either the first terminal or the second terminal.

18. The battery of claim 17, wherein the positive thermal coefficient layer is in electrical communication with the first terminal.

19. A battery pack comprising a plurality of cells, each of the cells including:
a) a first terminal in electrical communication with a first electrode of the battery, wherein the first terminal is a negative terminal;
b) a second terminal in electrical communication with a second electrode of the battery, wherein the second terminal is a positive terminal;
c) a battery can that includes aluminum and is electrically insulated from the first terminal, wherein at least a portion of the battery can is at least a component of the second terminal, or is electrically connected to the second terminal, the battery can including a cell casing and a lid which are in electrical communication with each other; and
d) at least one current interrupt device in electrical communication with the battery can, the current interrupt device including,
i) a first conductive plate, composed at least in part of aluminum, in electrical communication with the second electrode; and
ii) a second conductive plate, composed at least in part of aluminum, in electrical communication with the first conductive plate and with the lid of the battery can, wherein the first conductive plate is between the second electrode and the second conductive plate, and in electrical communication with the lid through the second conductive plate, wherein the second conductive plate separates from the first conductive plate without rupturing when pressure inside the battery is greater than a predetermined value, whereby a current flow between the second electrode and the second terminal is interrupted.

20. The battery pack of claim 19, wherein the cells are in series and no cells are connected in parallel.

21. The battery pack of claim 19, wherein at least one cell includes a cell casing having a prismatic cross-sectional shape.

22. A method of producing a battery, comprising the steps of:
a) disposing a first electrode and a second electrode within a battery can that includes a cell casing and a lid which are in electrical communication with each other, the battery can being in electrical communication with the second electrode and wherein the cell casing and lid include aluminum;
b) forming a first terminal in electrical communication with the first electrode, and electrically insulated from the battery can, wherein the first terminal is a negative terminal;
c) forming a second terminal, wherein at least a portion of the battery can is a component of the second terminal, or is electrically connected to the second terminal, and wherein the second terminal is a positive terminal; and
d) forming a current interrupt device in electrical communication with the battery can, the current interrupt device including:
i) a first conductive plate, composed at least in part of aluminum, in electrical communication with the second electrode; and
ii) a second conductive plate, composed at least in part of aluminum, in electrical communication with the first conductive plate and with the lid of the battery can, wherein the first conductive plate is between the second electrode and the second conductive plate, and in electrical communication with the lid through the second conductive plate, the second conductive plate separating from the first conductive plate without rupturing when pressure inside the battery is greater than a predetermined value, whereby a current flow between the second electrode and the second terminal is interrupted.

* * * * *